United States Patent
Sellers

(10) Patent No.: US 7,891,738 B2
(45) Date of Patent: Feb. 22, 2011

(54) CHILD SEAT

(75) Inventor: Gregory S. Sellers, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 145 days.

(21) Appl. No.: 12/354,732

(22) Filed: Jan. 15, 2009

(65) Prior Publication Data

US 2009/0322138 A1 Dec. 31, 2009

Related U.S. Application Data

(60) Provisional application No. 61/075,337, filed on Jun. 25, 2008.

(51) Int. Cl.
 A47C 7/54 (2006.01)
 A47C 7/00 (2006.01)
 A47D 1/10 (2006.01)
(52) U.S. Cl. .............. 297/411.27; 297/250.1; 297/440.1
(58) Field of Classification Search ............ 297/116, 297/411.34, 411.32, 411.27, 411.38, 440.1, 297/440.13, 440.14, 250.1, 255, 256
 See application file for complete search history.

(56) References Cited

U.S. PATENT DOCUMENTS

| | | | |
|---|---|---|---|
| 2,411,137 A * | 11/1946 | Neufeld ............. | 297/350 |
| 4,108,489 A * | 8/1978 | Salzman ............ | 297/37 |
| 4,754,999 A | 7/1988 | Kain | |
| 5,123,699 A * | 6/1992 | Warburton .......... | 297/219.1 |
| 5,496,092 A | 3/1996 | Williams | |
| 5,797,655 A * | 8/1998 | Miles .............. | 297/411.23 |
| 6,045,183 A | 4/2000 | Weber | |
| 6,752,462 B1 | 6/2004 | Kain | |
| 6,767,058 B2 * | 7/2004 | McClellan-Derrickson | . 297/255 |
| 7,066,536 B2 * | 6/2006 | Williams et al. ..... | 297/250.1 |
| 2007/0228792 A1 | 10/2007 | Chen et al. | |
| 2007/0236061 A1 | 10/2007 | Meeker | |

FOREIGN PATENT DOCUMENTS

| | | |
|---|---|---|
| CN | 200960864 Y | 10/2007 |
| DE | 693 12 495 T2 | 3/1998 |
| EP | 0 927 659 A | 7/1999 |
| EP | 1 842 716 A2 | 10/2007 |
| WO | 9321871 | 11/1993 |
| WO | 9412806 | 6/1994 |
| WO | 2006/030243 A2 | 3/2006 |
| WO | 2006030243 | 3/2006 |

* cited by examiner

Primary Examiner—Milton Nelson, Jr.
(74) Attorney, Agent, or Firm—Winston Hsu; Scott Margo

(57) ABSTRACT

A child seat includes a carrier, an armrest and a flexible connector. The carrier includes a loading surface and a connecting part. The flexible connector is connected between the carrier and the armrest. When the child seat is in an un-assembled state, the armrest is separated from the connecting part. When the child seat is in an assembled state, the armrest is fixed to the connecting part. Alternatively, the child seat includes a carrier, an armrest and a connector. The carrier includes a loading surface and a connecting part. The connector is connected with the carrier and the armrest. When the child seat is in an un-assembled state, the armrest is laid flat on the loading surface. When the child seat is in an assembled state, the armrest is fixed to the connecting part in an upright state.

12 Claims, 6 Drawing Sheets

CHILD SEAT

CROSS REFERENCE TO RELATED APPLICATIONS

This non-provisional application claims the benefit of U.S. provisional application No. 61/075,337, filed on Jun. 25, 2008 and included herein by reference.

BACKGROUND OF THE INVENTION

1. Field of the Invention

The invention relates to a child seat, and more particularly, to a child seat whose armrest is capable of being separated from a carrier.

2. Description of the Prior Art

For any company, how to reduce product cost is a highly significant issue. In general, product costs include shipping costs. If a volume of a package is too large, the shipping cost is increased. Therefore, in order to lower costs, a volume of a package must be reduced as much as possible. Currently, child seats (e.g., child safety seats or high chairs) are mostly packaged and shipped in an assembled state, or the child seat is designed as an integrated product itself, which increases the whole volume of the package. As a result, the package is not compact enough, and shipping costs are raised.

SUMMARY OF THE INVENTION

Therefore, one of the objectives of the present invention is to provide a child seat whose armrest is capable of being separated from a carrier. In this way, the packaging volume can be reduced, thereby reducing shipping costs.

According to one exemplary embodiment of the present invention, a child seat is disclosed. The child seat includes an armrest; a carrier having a loading surface and a connecting part; and a flexible connector, connected between the carrier and the armrest. When the child seat is in an un-assembled state, the armrest is separated from the connecting part; when the child seat is in an assembled state, the armrest is fixed to the connecting part.

According to another exemplary embodiment of the present invention, a child seat includes a carrier, an armrest and a connector. The carrier includes a loading surface and a connecting part. The connector is connected to the carrier and the armrest. When the child seat is in an un-assembled state, the armrest lies flat on the loading surface. When the child seat is in an assembled state, the armrest is fixed to the connecting part in an upright state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
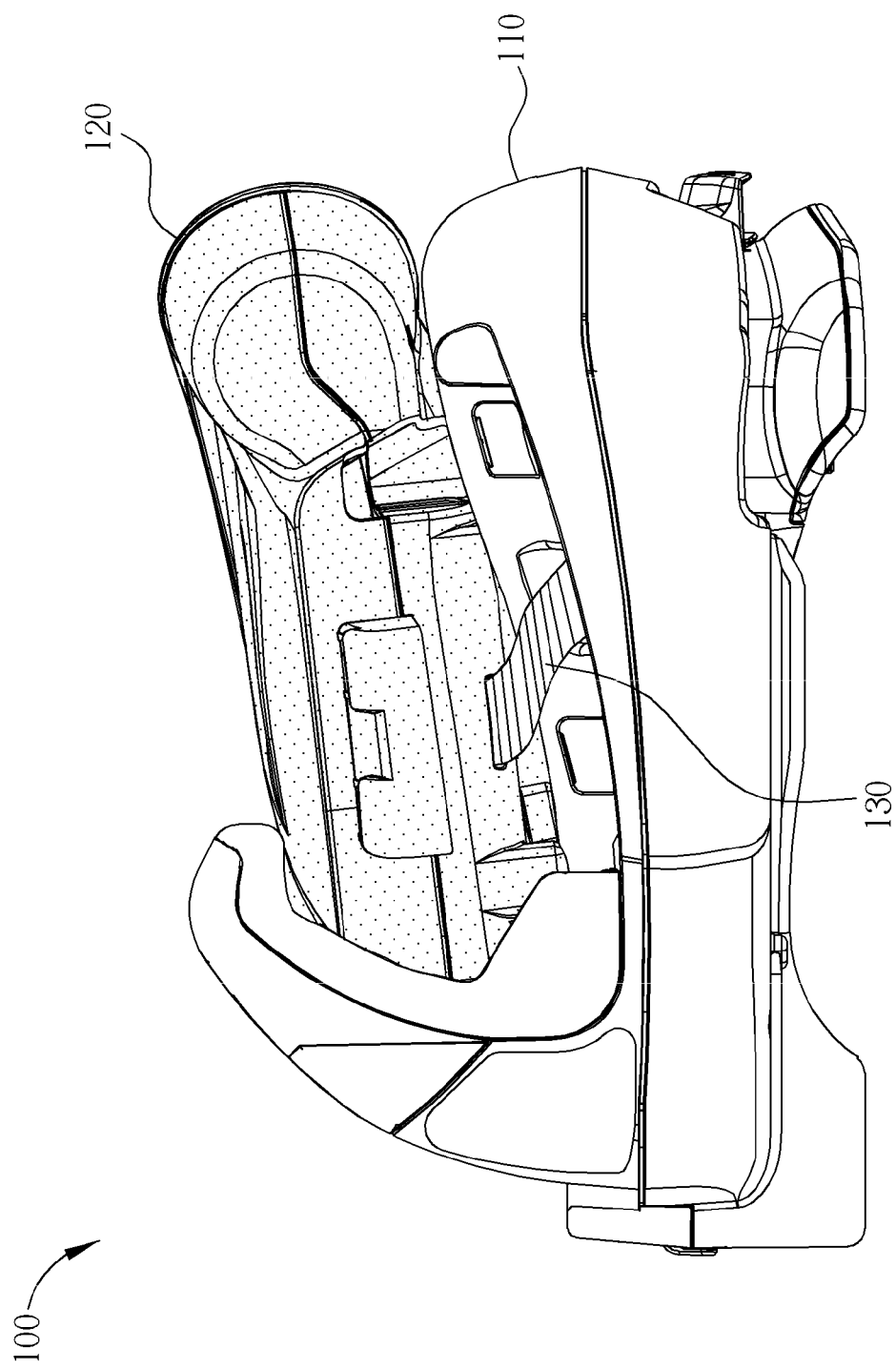
FIG. 1 is a diagram of a child seat according to an exemplary embodiment of the present invention.

Please refer to FIG. 1. FIG. 1 is a diagram of a child seat according to an embodiment of the present invention. As shown in FIG. 1, the child seat 100 (e.g., a child's car seat) includes a carrier 110, an armrest 120, and a flexible connector 130. The flexible connector 130 is connected between the carrier 110 and the armrest 120. In this embodiment, the child seat 100 is a child's car seat, and the flexible connector 130 is implemented using a weaving belt. However, this is for illustrative purposes only, and is not meant to be a limitation of the present invention.

Figure 2:
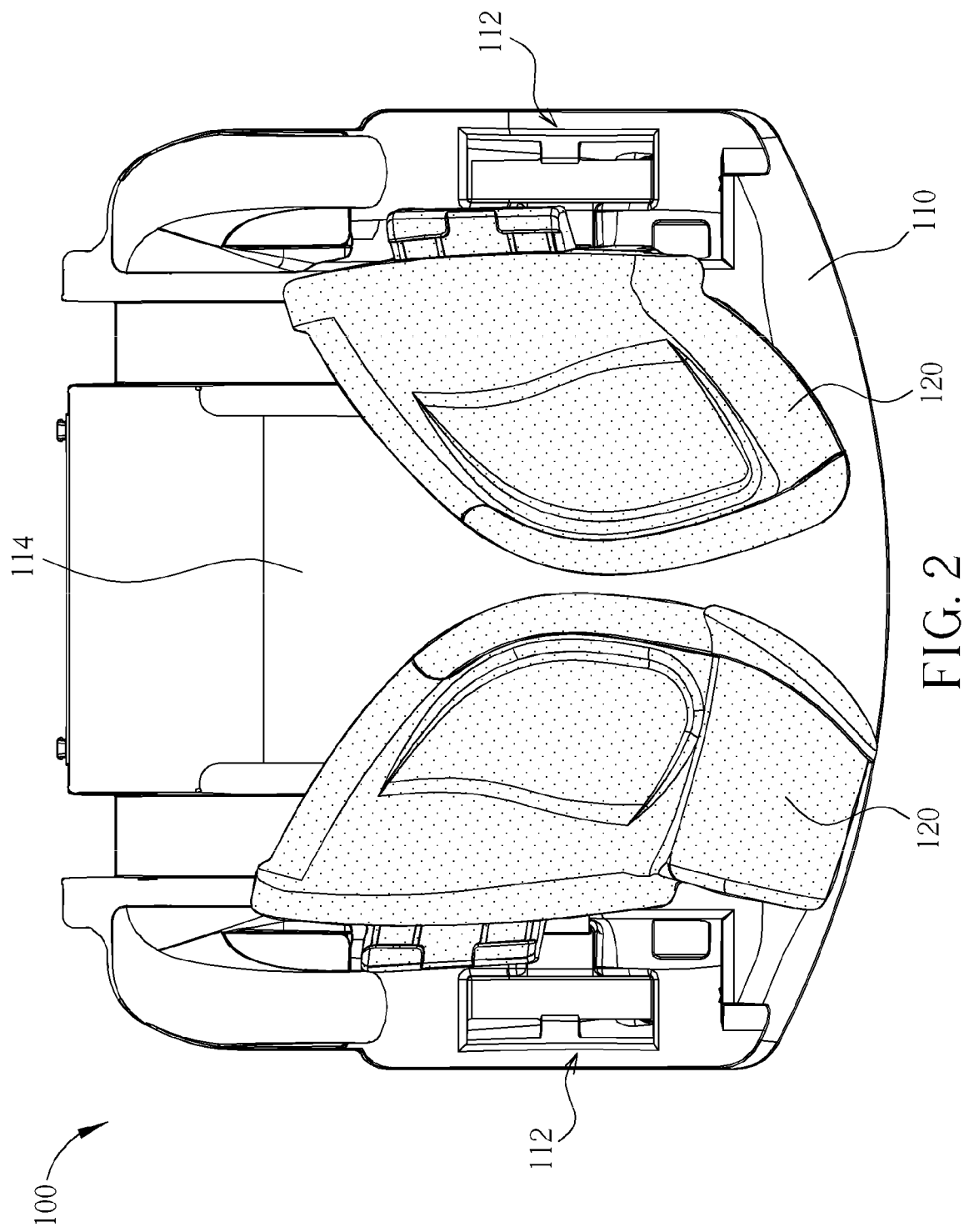
FIG. 2 is a diagram illustrating an armrest of the child seat in FIG. 1 in an unassembled state.

Please refer to FIG. 2. FIG. 2 is a diagram of the child seat 100 in FIG. 1 in an unassembled state. As illustrated in FIG. 2, the carrier 110 includes a connecting part 112 and a loading surface 114. When the child seat 100 is in the unassembled state. the armrest 120 is separated from the connecting part 112, and is only connected to the carrier 110 via the flexible connector 130 (i.e., the weaving belt). Therefore, as the armrest 120 is not fixed to the connecting part 112 of the carrier 110, the armrest 120 can be placed freely. For instance, when packing the child seat 100, since the armrest 120 is not fixed to the carrier 110, the armrest 120 can be laid flat on the loading surface 114 of the carrier 110 to reduce the overall package volume (as shown in FIG. 2). In this way, the objective of reducing the shipping cost can be achieved.

Figure 3:
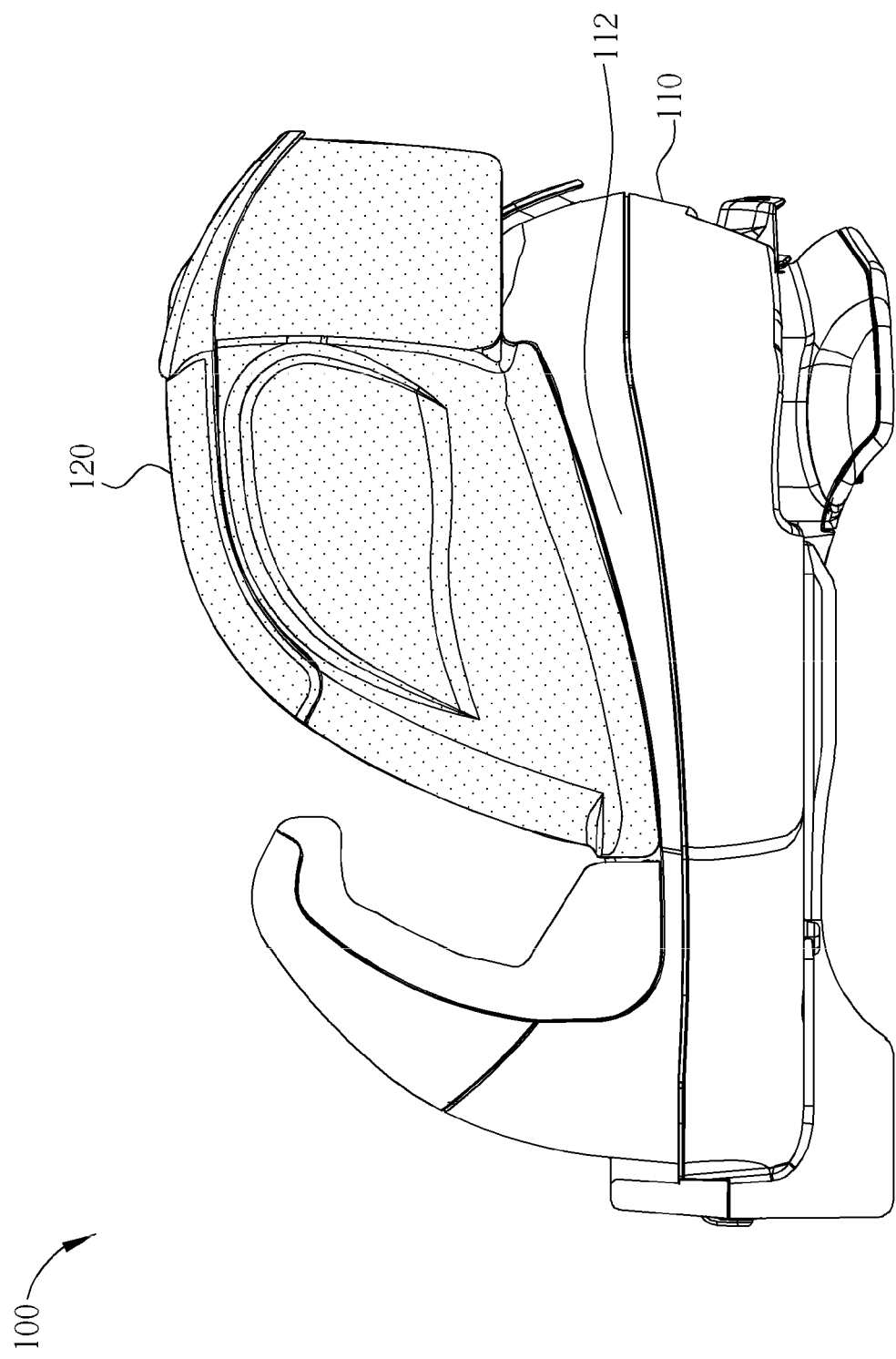
FIG. 3 is a diagram illustrating the armrest of the child seat in FIG. 1 in an assembled state.

Please refer to FIG. 3. FIG. 3 is a diagram of the child seat 100 in FIG. 1 in an assembled state. As shown in FIG. 3, the armrest 120 of the child seat 100 is fixed to the connecting part 112 of the carrier 110 in a upright state to serve as a normal armrest. The flexible connector 120 (i.e., the weaving belt) is totally accommodated between the armrest 120 and the connecting part 112; that is, when the child seat 100 is utilized, the flexible connector 120 (i.e., the weaving belt) is absolutely invisible. The following will further address the armrest 120 and the carrier 110 in detail.

Figure 4:
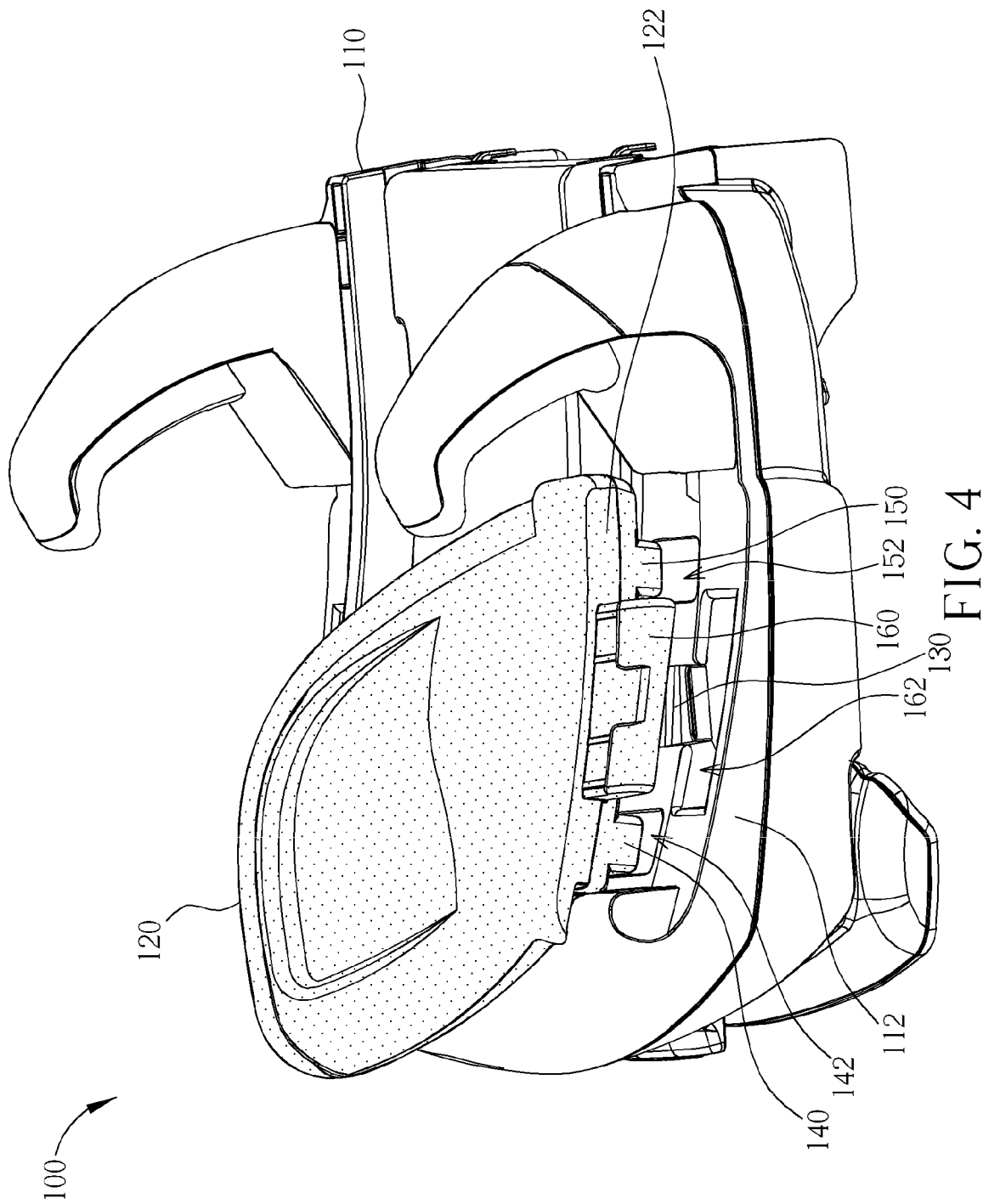
FIG. 4 is a structural diagram of the armrest and a connecting part shown in FIG. 2.

The present embodiment employs at least one first positioning element on the armrest 120 and at least one second positioning element disposed on the connecting part 112 that corresponds to the first positioning element to position the armrest 120 to the connecting part 112. Please refer to FIG. 4. FIG. 4 is a structural diagram of the armrest 120 and the connecting part 112 of the carrier 110 shown in FIG. 1. As shown in FIG. 4, the armrest 120 includes a first positioning element 140 and a third positioning element 150, and the connecting part 112 of the carrier 110 includes a second positioning element 142 and a fourth positioning element 152. The locations where the second and fourth positioning elements 142, 152 are disposed on the connecting part 112 correspond to the positions where the first and third positioning elements 140, 150 are disposed on the armrest 120, respectively. With the assistance of the first, second, third, and fourth positioning elements 140, 142, 150, 152, the user can easily fix the armrest 120 to the connecting part 112 of the carrier 110 through the first, second, third, and fourth positioning elements 140, 142, 150, 152.

Please note that, in this embodiment, the first and third positioning elements 140, 150 are implemented using protruding parts respectively, while the second and fourth positioning elements 142, 152 are implemented using recession parts corresponding to the first and third positioning elements 140, 150, respectively. However, this is for illustrative purposes only, and is not meant to be a limitation of the invention. For example, in other exemplary embodiments of the present invention, the first and third positioning elements 140, 150 of the armrest 120 can be implemented using recession parts, while the second and fourth positioning elements 142, 152 of the connecting part 112 of the carrier 110 are implemented using protruding parts corresponding to the first and third positioning elements 140, 150, respectively. Such an alternative design also falls within the scope of the present invention.

Please note that, in this embodiment, the armrest 120 has two positioning elements (i.e., the first and third positioning elements 140, 150), and the connecting part 112 of the carrier 110 has two corresponding positioning elements (i.e., the second and fourth positioning elements 142, 152). However, the number of positioning elements is not meant to be a limitation of the present invention. For instance, in other exemplary embodiments of the present invention, the armrest 120 is allowed to have any number of positioning elements disposed thereon (e.g., three positioning elements), wherein the carrier 110 has a corresponding number of positioning elements disposed thereon (e.g., three positioning elements). Such an alternative design still falls within the scope of the present invention.

Please refer to FIG. 4 again. As illustrated in FIG. 4, the armrest 120 has a combining surface 122, and a first combining element 160 located on the combining surface 122. In addition, the connecting part 112 has a second combining element 162. Through engagement of the first combining element 160 and the second combining element 162, the armrest 120 can be fixed on the connecting part 112 of the carrier 110 for user utilization.

Please note that, in this embodiment, the first combining element 160 is implemented using a protruding part, while the second combining element 162 is implemented using a combining slot corresponding to the protruding part. However, this is for illustrative purposes only, and is not meant to be a limitation of the present invention. For instance, in other exemplary embodiments of the present invention, the second combining element 162 can be implemented using a protruding part, and then the first combining element 160 is implemented using a combining slot corresponding to the protruding part. Such an alternative design also falls within the scope of the present invention. Alternatively, any pair of corresponding male and female buckles capable of fixing the armrest 120 to the connecting part 112 of the carrier 110 can be adopted to implement the first combining element 160 and the second combining element 162. This is also within the scope of the present invention.

As mentioned above, when the child seat 100 is in an unassembled state, the user may plug the first and the third positioning elements 140, 150 (i.e., the protruding parts) of the armrest 120 into the second and the fourth positioning elements 142, 152 (i.e., the recession parts) of the connecting part 112 of the carrier 110 to position the armrest 120 to the connecting part 112 of the carrier 110. Then, the user can rotate the armrest 120 to make the first combining element 160 (i.e., the protruding part) engage with the second combining element 162 (i.e., the combining slot) to thereby fix the armrest 120 to the connecting part 112 of the carrier 110 so the child seat 100 is in an assembled state for user utilization.

Figure 5:
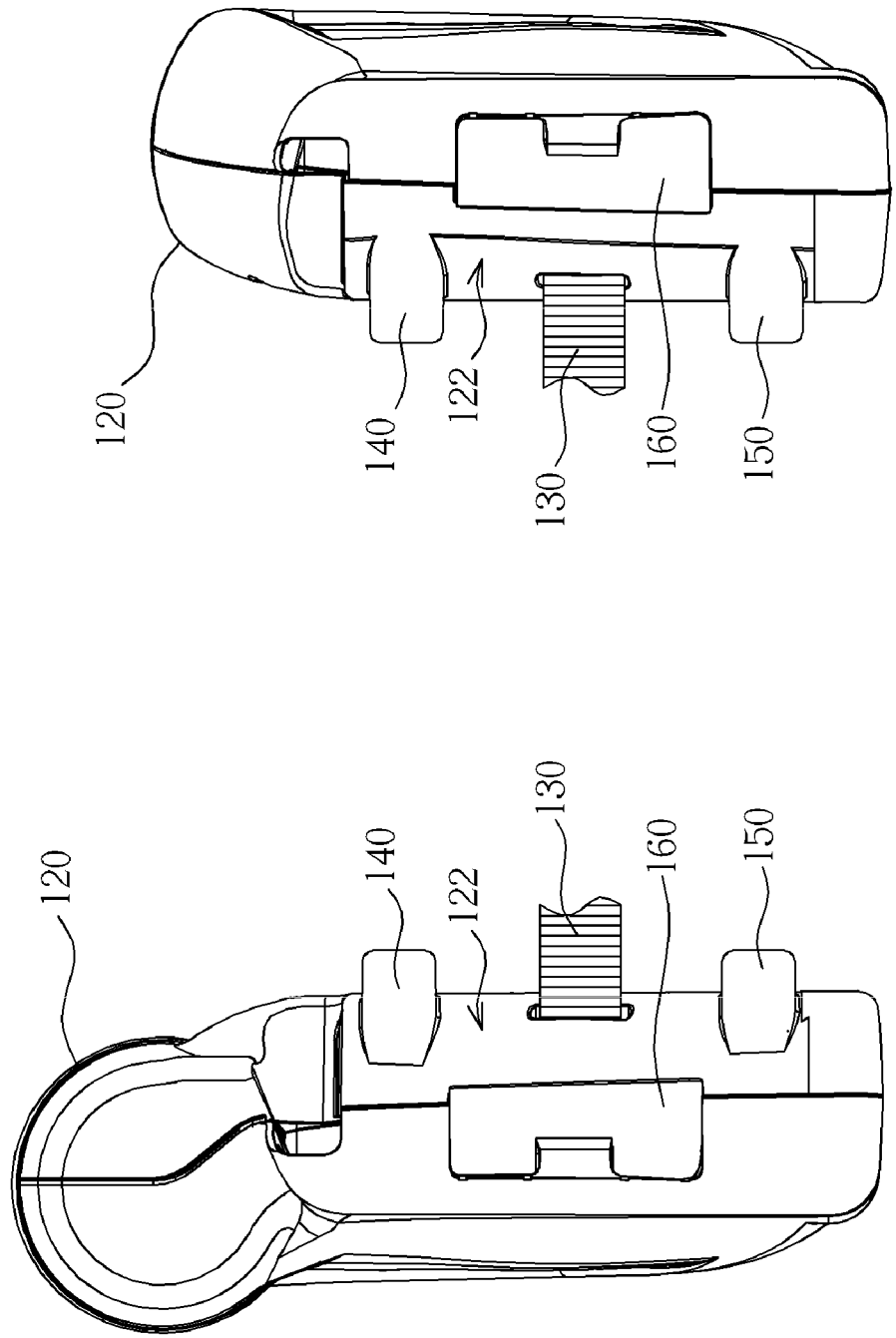
FIG. 5 is a diagram illustrating relative positions of a flexible connector and the armrest.
Figure 6:
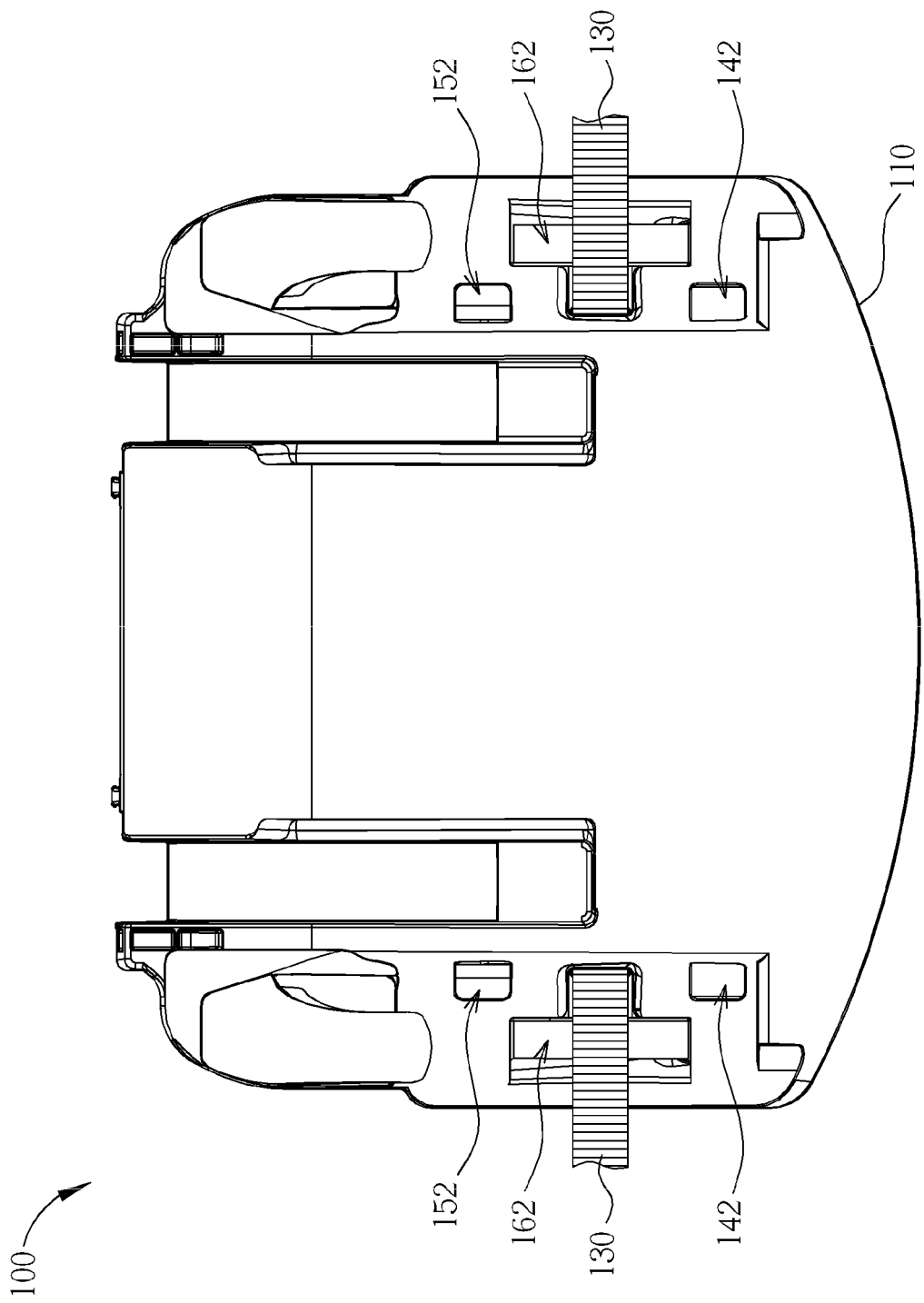
FIG. 6 is a diagram illustrating relative positions of the flexible connector and the connecting part.

Please refer to FIG. 5 and FIG. 6. FIG. 5 is a diagram illustrating the relative locations of the flexible connector 130 and the armrest 120, and FIG. 6 is a diagram illustrating the relative locations of the flexible connector 130 and the connecting part 112. As shown in FIG. 5 and FIG. 6, the flexible connector 130 is located on the combining surface 122 of the armrest 120, one end of the flexible connector 130 is connected between the first positioning element 140 and the third positioning element 150, and the other end of the flexible connector 130 is connected between the second positioning element 142 and the fourth positioning element 152 of the connecting part 112 of the carrier 110.

In the aforementioned embodiment, the armrest 120 is connected to the connecting part 112 of the carrier 110 through the flexible connector 130. However, this is not meant to be a limitation of the present invention. In practice, the armrest 120 can be connected to the connecting part 112 of the carrier 110 through a non-flexible connector (e.g., a pivot), and the armrest 120 can be rotated through the pivot to enable the child seat 100 to selectively be in an unassembled state (i.e., the armrest 120 is laid flat on the surface of the carrier 110) or in an assembled state (i.e., the armrest 120 is fixed to one side of the carrier 110 in a upright state). In this way, when packing the child seat 100, the armrest 120 could be laid flat on the carrier 110 to achieve the objective of saving the packaging volume, resulting in a decrease in shipping costs accordingly.

Compared with the conventional art, when packing the child seat of the present invention, the armrest can be separated from the carrier, reducing packaging volume and thereby accomplishing the goal of decreasing the shipping costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child seat, comprising:
    an armrest, comprising:
        a combining surface; and
        a first combining element, wherein the first combining element is located on the combining surface;
    a carrier, comprising:
        a loading surface; and
        a connecting part, comprising:
            a second combining element, wherein the armrest is fixed to the carrier through engagement of the first combining element and the second combining element; and
    a flexible connector, connecting the carrier and the armrest;
    wherein one of the first combining element and the second combining element comprises a protruding part, and the other of the first combining element and the second combining element comprises a combining slot corresponding to the protruding part, and when the child seat is in an unassembled state, the armrest is separated from the connecting part; and when the child seat is in an assembled state, the armrest is fixed to the connecting part.

2. The child seat of claim 1, wherein when the child seat is in the unassembled state, the armrest is laid flat on the loading surface.

3. The child seat of claim 1, wherein when the child seat is in the assembled state, the flexible connector is accommodated between the armrest and the connecting part.

4. The child seat of claim 1, wherein the flexible connector is a belt.

5. The child seat of claim 1, wherein the armrest comprises a first positioning element and a third positioning element, the connecting part comprises a second positioning element and a fourth positioning element corresponding to the first positioning element and the third positioning element respectively, the armrest is positioned onto the connecting part through the first, second, third and fourth positioning elements, one end of the flexible connector is connected between the first positioning element and the third positioning element, and the other end of the flexible connector is connected between the second positioning element and the fourth positioning element.

6. The child seat of claim 1, wherein the child seat is a child's car seat.

7. The child seat of claim 1, wherein the first combining element and the second combining element is a pair of corresponding male and female buckles.

8. The child seat of claim 1, wherein the flexible connector is located on the combining surface.

9. The child seat of claim 1, wherein the armrest comprises at least a first positioning element, the connecting part comprises a second positioning element corresponding to the first positioning element, and the armrest is positioned onto the connecting part through the first positioning element and the second positioning element.

10. The child seat of claim 9, wherein one of the first positioning element and the second positioning element comprises a protruding part, and the other of the first positioning element and the second positioning element comprises a recess corresponding to the protruding part.

11. A child seat, comprising:
an armrest;
a carrier, comprising a loading surface and a connecting part; and
a flexible connector, connecting the carrier and the armrest;
wherein when the child seat is in an unassembled state, the armrest is separated from the connecting part; when the child seat is in an assembled state, the armrest is fixed to the connecting part; the armrest comprises at least a first positioning element, the connecting part comprises a second positioning element corresponding to the first positioning element, and the armrest is positioned onto the connecting part through the first positioning element and the second positioning element; one of the first positioning element and the second positioning element comprises a protruding part, and the other of the first positioning element and the second positioning element comprises a concave part corresponding to the protruding part.

12. A child seat, comprising:
an armrest;
a carrier, comprising a loading surface and a connecting part; and
a flexible connector, connecting the carrier and the armrest;
wherein when the child seat is in an unassembled state, the armrest is separated from the connecting part; when the child seat is in an assembled state, the armrest is fixed to the connecting part; the armrest comprises a first positioning element and a third positioning element, the connecting part comprises a second positioning element and a fourth positioning element corresponding to the first positioning element and the third positioning element respectively, the armrest is positioned onto the connecting part through the first, second, third and fourth positioning elements, one end of the flexible connector is connected between the first positioning element and the third positioning element, and the other end of the flexible connector is connected between the second positioning element and the fourth positioning element.

* * * * *